(12) United States Patent
Houldsworth

(10) Patent No.: US 6,360,233 B1
(45) Date of Patent: Mar. 19, 2002

(54) DYNAMIC MEMORY SPACE ALLOCATION

(75) Inventor: Richard J. Houldsworth, Horley (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/335,019

(22) Filed: Jun. 17, 1999

(30) Foreign Application Priority Data

Jun. 25, 1998 (GB) .............................................. 9813592

(51) Int. Cl.⁷ .............................................. G06F 17/30
(52) U.S. Cl. .................................................... 707/206
(58) Field of Search ........................ 707/206; 711/165, 711/171, 103

(56) References Cited

U.S. PATENT DOCUMENTS

| | | | | |
|---|---|---|---|---|
| 5,560,003 A | * | 9/1996 | Nilsen et al. ................ | 707/206 |
| 5,784,699 A | * | 7/1998 | McMahon et al. ........... | 711/171 |
| 6,047,295 A | * | 4/2000 | Endicott et al. ............. | 707/206 |
| 6,055,612 A | * | 4/2000 | Spertus et al. ............... | 711/165 |

OTHER PUBLICATIONS

Gupta et al. (IEEE publication, 1988) discloses reliable garbage collection in distributed object oriented systems, Computer Software and Applications Conference, COMPSAC 88, pp. 324–328.*

Srisa–An et al. (IEEE publication, 2000) discloses scalable hardware–algorithm for mark–sweep garbage collection; Euromicro Conference 200. Proc. pp. 274–281 (vol. 1).*

One pass real–time generational mark–sweep garbage collection by J. Armstrong et al., pp. 313–322.*

Mark during sweep rather than mark then sweep by C. Queinnect et al., pp. 1–12.*

Garbage collection with multiple processes an exercise in parallelism by L. Lamport, pp. 50–54.*

By R. Jones et al., "Garbage Collection: Algorithms for Automatic Dynamic Memory Management" Pub., John Wiley & Sons 1996, ISBN 0–471–94148–4, pp. 1–18.

* cited by examiner

*Primary Examiner*—Diane D. Mizrahi

(57) ABSTRACT

A data processing apparatus includes a heap memory (HM) containing a plurality of data objects (DO) each accessed by respective pointers originating from programme thread memory stacks (SF). In one embodiment, a garbage collection utility (100) periodically sweeps the heap (HM) and identifies redundant data objects to a free-list (FL) to enable their memory space to be re-used. System requests for memory (AREQ), if they cannot be met by the free list (FL), are stored (ALLIST) to be handled subsequently. As further data objects are marked redundant during sweeping, the space they occupy is first offered to the stored system requests (ALLIST) before being made generally available through the free-list (FL).

8 Claims, 2 Drawing Sheets

DYNAMIC MEMORY SPACE ALLOCATION

The present invention relates to a method and apparatus for handling stored data objects and particularly, but not exclusively, to the handling of system requests for allocation of memory occurring during garbage collection procedures executing in real time in real or virtual memory space of a data processing apparatus.

BACKGROUND OF THE INVENTION

Garbage collection is the automated reclamation of system memory space after its last use by a program. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18. Whilst the storage requirements of many computer programmes are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the programme runs, is essential.

A number of garbage collection techniques involve sweeping of the data objects on the memory heap in order to identify those objects which have become redundant. In such garbage collected systems, memory allocation requests operate concurrently with the sweeper process, which process moves dead (garbage collected) objects to a free structure. If the system memory management cannot service an allocation request immediately from the free structure, typically the allocation process is blocked until completion of the current sweep cycle. The allocation request may then be retried, and if it again fails, more extreme actions are taken. These could include heap expansion or compaction, or abortion of the process with an error. As will be recognised, the blocking of allocation requests can slow the system and generally reduces efficiency.

SUMMARY OF THE INVENTION

It is therefore an object of the present invention to provide an improved technique for handling of memory allocation requests, and an apparatus embodying the same.

In accordance with the present invention there is provided a method of memory management for use in data processing apparatuses, wherein a random-access memory contains a plurality of data objects, each said data object being at a respective known location within the memory and being accessed via respective pointers carried by memory stacks, the method comprising periodically sweeping the memory to determine those data objects having no extent pointers thereto from any source and transferring the blocks of memory space taken thereby to a free memory structure, with external requests for memory space being met by allocation from the free memory structure; characterised in that external requests for which there is insufficient memory available from the free memory structure are entered in a request list, with freed blocks of memory space being made available to the listed requests and only transferred to the free memory structure if not allocated to any listed request. By directing the freed blocks of memory to those program threads or system utilities that particularly require them (as evinced by their being in the unfulfilled requests list), the general efficiency of the system is improved, and the more drastic measures such as stopping to compact the heap are deferred, and in some instances avoided altogether.

The transfer of freed blocks to the free memory structure may suitably comprise establishing pointers thereto from an address table for freed blocks, and entries in the request list may be held in first-in-first-out order, with the freed blocks being made available to stored external requests in sequence of oldest to most recent request.

Although the present invention reduces the need for extreme measures to make memory space available, one or more additional memory reclamation techniques (such as compaction) may still be applied to the contents of the random access memory at the conclusion of a sweep with memory space recovered thereby being used to clear listed requests. In such circumstances, a record is suitably maintained, for each listed request, of the time since listing, with the application of the one or more additional memory reclamation techniques being triggered by one or more of the listed requests having been on the list for longer than a predetermined period. As an alterative to maintaining a real-time count, the time for which a request has been on the list may be given as the number of memory sweeps undertaken since listing.

Also in accordance with the present invention, there is provided data processing apparatus comprising a data processor coupled with a random access memory containing a plurality of data objects, each said data object being at a respective known location within the memory and being accessed via respective pointers carried by memory stacks, the processor being configured to periodically sweep the memory contents to identify those stored data objects having no extent pointers thereto and transfer the blocks of memory space taken thereby to a free memory structure, the processor being arranged to meet programme requests for memory space by allocation from the free memory structure; characterised by a further storage means coupled with the processor, the processor being arranged to enter in said further storage means those programme requests for which there is insufficient memory available from the free structure, and to allocate the freed blocks of memory to one or more of the stored programme requests in preference to placing thereof in the free memory structure.

The apparatus may comprise still further storage means holding the free memory structure in the form of an ordered list of pointers to the random-access memory locations of the freed memory objects, and the further storage means holding the stored programme requests suitably includes, for each entry, a respective field in which the processor maintains an ongoing count of the number of memory sweeps since that request was stored.

The invention will now be described by way of example only, with reference to the accompanying drawings, in which:

DESCRIPTION OF THE PREFERRED EMBODIMENTS

Figure 1:
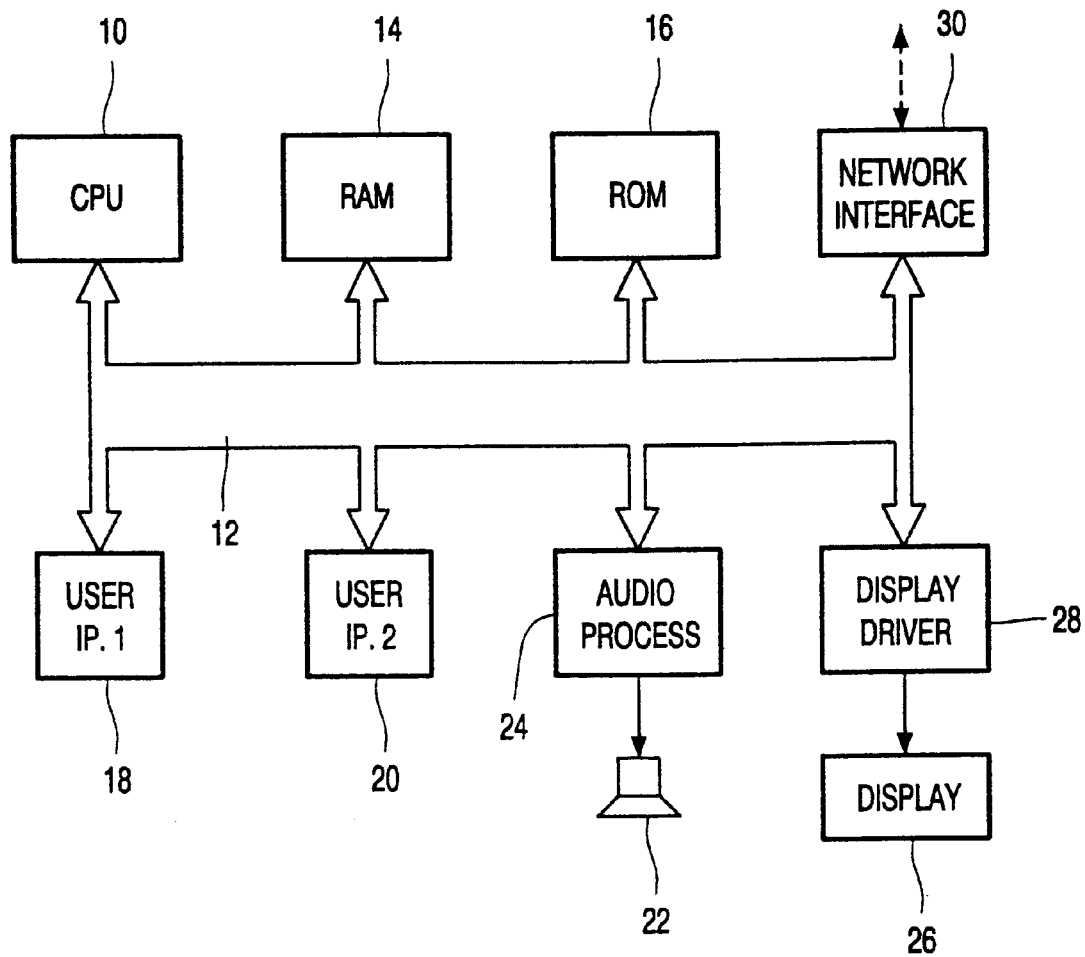
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment.

The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via on-line link to remote sites, for example via the Internet, to which end the system is provided with a network interface 30 coupled to the bus 12.

The present invention is particularly embodied in memory management for a working area of the RAM 14 under control of the CPU 10; a controlling programme for this may initially be held in ROM 16 and loaded up with the operating system on power-up. The following examples are compliant with memory management techniques in the Java (® Sun Microsystems Inc) virtual machine and the terminology should be construed accordingly: it will be recognised however that the present invention is not restricted to Java-compliant systems, nor to purely virtual memory management.

Figure 2:
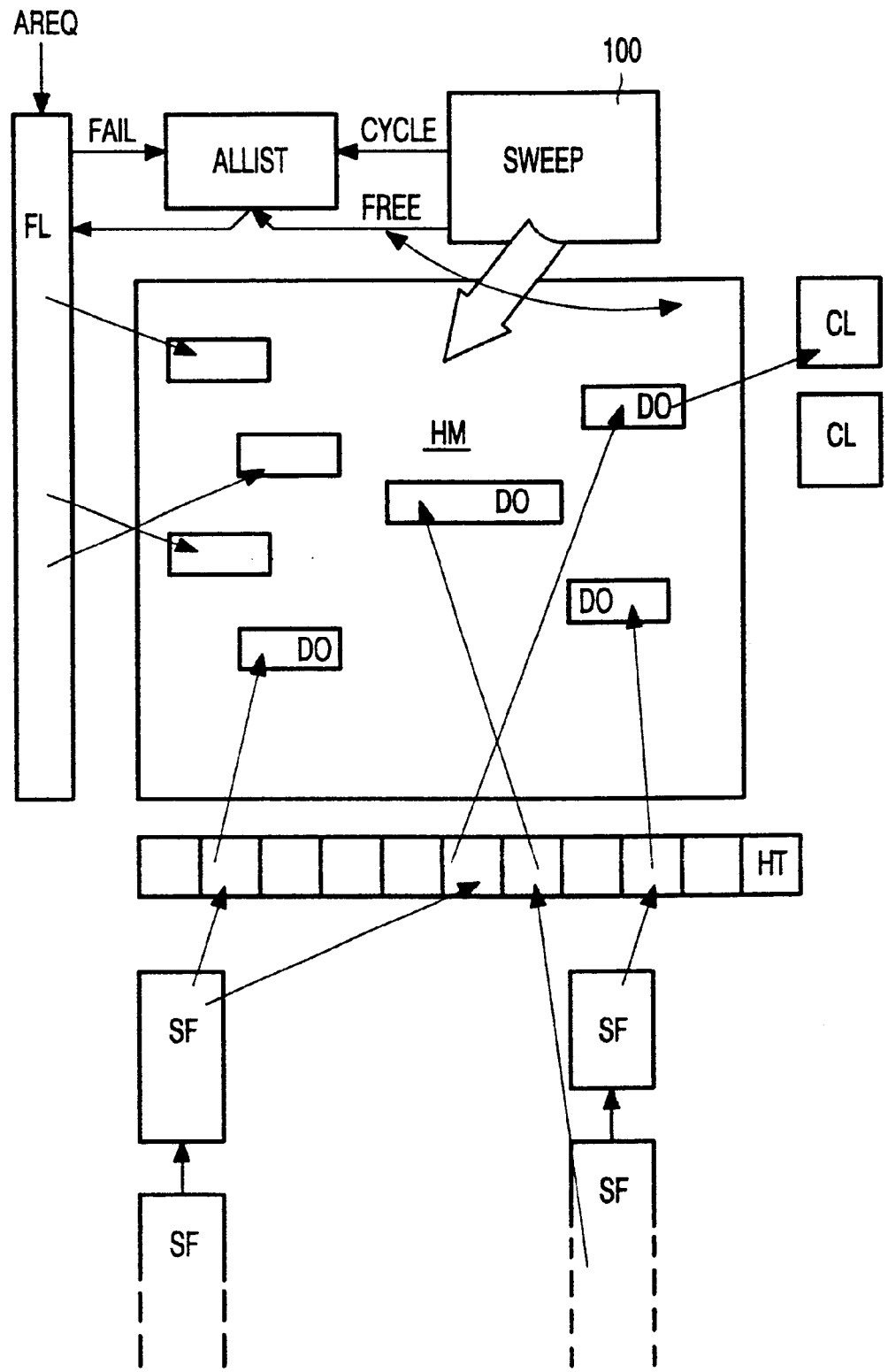
FIG. 2 schematically represents the functional relationship between sweep function and a number of discrete memory areas in the system of FIG. 1.

FIG. 2 schematically represents a number of discrete memory areas from the system of FIG. 1 and, in particular, a heap memory HM holding a large number of data objects DO for use by various programme threads. In the arrangement shown, it is the heap memory HM for which garbage collection is performed, such that data objects are removed by sweeper 100 following their last or only reference by a programme: the space released by the objects removal is held in a free structure: in this embodiment the free structure is formed by the unused or available blocks identified by pointers from or to a free list FL. The particular form of the free structure is not an essential feature of the present invention, and the skilled reader will be aware of alternative configurations that might equally well be used.

Each operating programme thread has its own collection of stack frames SF which reference objects in the heap memory HM via a handle table HT. Two class structures CL are shown to the right of the heap: these may be referenced by data objects DO in the heap but may not themselves place pointers on data objects. The particular form and function of the class structures has no bearing upon operation according to the present invention and will not be further described.

In this system, allocation requests AREQ to the free list FL that initially fail result in those requests being inserted into an allocation request structure ALLIST. The process requesting allocation is blocked until this request is serviced. Concurrently, the sweeper 100 inserts newly released blocks in the free structure by adding them to the free list FL. However, at insertion, the free block is compared with the outstanding requests in structure ALLIST, and if possible a block is diverted from the free block structure directly to the blocked process, allowing it to recommence and removing the request from ALLIST. At completion of a sweeper cycle, the remaining outstanding requests in ALLIST are examined. Requests are preferably serviced in FIFO order, although prioritisation criteria may be applied, though this would require careful management to avoid certain requests with a low assigned priority becoming permanently sidelined. If any requests in ALLIST are past a certain age, the extreme actions mentioned previously may be taken. The age of requests in ALLIST may suitably be measured in terms of sweeper cycles, with a respective count associated with each entry in ALLIST, and all counts incremented by one at the completion of a cycle.

This arrangement has the advantage of reducing the average time for allocation requests to be serviced. Processes will be treated more fairly, since S those awaiting data will receive released data blocks directly before they become available to other processes through the free list FL. Also, because undesirable emergency actions such as heap compaction or "out-of-memory" errors are deferred and in many cases avoided, the performance of the system is improved.

Although defined principally in terms of a software browser implementation, the skilled reader will be well aware than many of the abovedescribed functional features could equally well be implemented in hardware or a combination of hardware and software. Also, it will be recognised that the procedure described may be applied to a range of memory management systems, whether including automated garbage collection procedures, or otherwise.

From reading the present disclosure, other modifications will be apparent to persons skilled in the art. Such modifications may involve other features which are already known in the design, manufacture and use of data processing apparatus and devices and component parts thereof and which may be used instead of or in addition to features already described herein.

What is claimed is:

1. A method of memory management for use in data processing apparatuses, wherein a random-access memory contains a plurality of data objects, each said data object being at a respective known location within the memory and being accessed via respective pointers carried by memory stacks, the method comprising the steps of:

periodically sweeping the memory to determine those data objects having no extent pointers thereto from any source; and transferring the blocks of memory space taken thereby to a free memory structure, with external requests for memory space being met by allocation from the free memory structure, wherein external requests for which there is insufficient memory available from the free memory structure are entered in a request list, with freed blocks of memory space being made available to the listed requests and only transferred to the free memory structure if not allocated to any listed request, and wherein one or more additional memory reclamation techniques are applied to the contents of the random access memory at the conclusion of a sweep with memory space recovered thereby being used to clear listed requests.

2. A method as claimed in claim 1, wherein the transfer of freed blocks to the free memory structure comprises establishing pointers thereto from an address table for freed blocks.

3. A method as claimed in claim 1, wherein entries in the request list are held in first-in-first-out order and the freed blocks are made available to stored external requests in sequence of oldest to most recent request.

4. A method as claimed in claim 1, wherein a record is maintained, for each listed request, of the time since listing, with the application of said one or more additional memory reclamation techniques being triggered by one or more of the listed requests having been on the list for longer than a predetermined period.

5. A method as claimed in claim 4, wherein the time for which a request has been on the list is given as the number of memory sweeps undertaken since listing.

6. A method as claimed in claim 1, wherein said one or more additional memory reclamation techniques include compaction of the memory contents.

7. A data processing apparatus comprising:

a data processor coupled with a random access memory containing a plurality of data objects, each said data object being at a respective known location within the memory and being accessed via respective pointers carried by memory stacks, the processor being configured to periodically sweep the memory contents to identify those stored data objects having no extent pointers thereto and transfer the blocks of memory space taken thereby to a free memory structure, the processor being arranged to meet program requests for memory space by allocation from the free memory structure;

a further storage means coupled with the processor, the processor being arranged to enter in said further storage means those program requests for which there is insufficient memory available from the free structure, and to allocate the freed blocks of memory to one or more of the stored program requests in preference to placing thereof in the free memory structure; and a second storage means holding said free memory structure in the form of an ordered list of pointers to the random-access memory locations of the freed memory objects.

8. Apparatus as claimed in claim 7, wherein the further storage means holding the stored program requests includes, for each entry, a respective field in which the processor maintains an ongoing count of the number of memory sweeps since that request was stored.

* * * * *